United States Patent [19]
Hutchings et al.

[11] Patent Number: 5,217,200
[45] Date of Patent: Jun. 8, 1993

[54] SOLENOID VALVE

[75] Inventors: Peter G. Hutchings, Nashua, N.H.; Matthew E. Leinheiser, Mishawaka; John W. Mezas, Granger, both of Ind.

[73] Assignee: South Bend Controls, Inc., South Bend, Ind.

[21] Appl. No.: 801,879

[22] Filed: Dec. 3, 1991

Related U.S. Application Data

[63] Continuation-in-part of Ser. No. 577,673, Sep. 4, 1990, Pat. No. 5,108,071.

[51] Int. Cl.⁵ .............................................. F16K 31/06
[52] U.S. Cl. ........................................ 251/86; 251/65; 251/88; 251/129.15
[58] Field of Search ............... 251/88, 129.19, 65, 251/86, 129.15

[56] References Cited

U.S. PATENT DOCUMENTS 2,698,159 12/1954 Crum .............................. 251/129.19
4,759,331  7/1988 Sausner .............................. 251/88 X Primary Examiner—Arnold Rosenthal
Attorney, Agent, or Firm—James D. Hall

[57] ABSTRACT

A laminar flow control valve having a unitary housing, wherein the valve housing is coupled to a housing for an electrically powered solenoid device. The poppet is loosely secured to the valve stem by use of a magnet, which permits lateral movement between the poppet and the valve stem. In the preferred embodiment, a hemispherical poppet is mounted to the stem of the operating mechanism by a magnet which is fixedly secured to the stem, permitting lateral movement of the poppet to ensure self-alignment with the valve seat upon closing of the valve. An alternative embodiment utilizes conical surfaces of the valve seat and poppet.

4 Claims, 2 Drawing Sheets

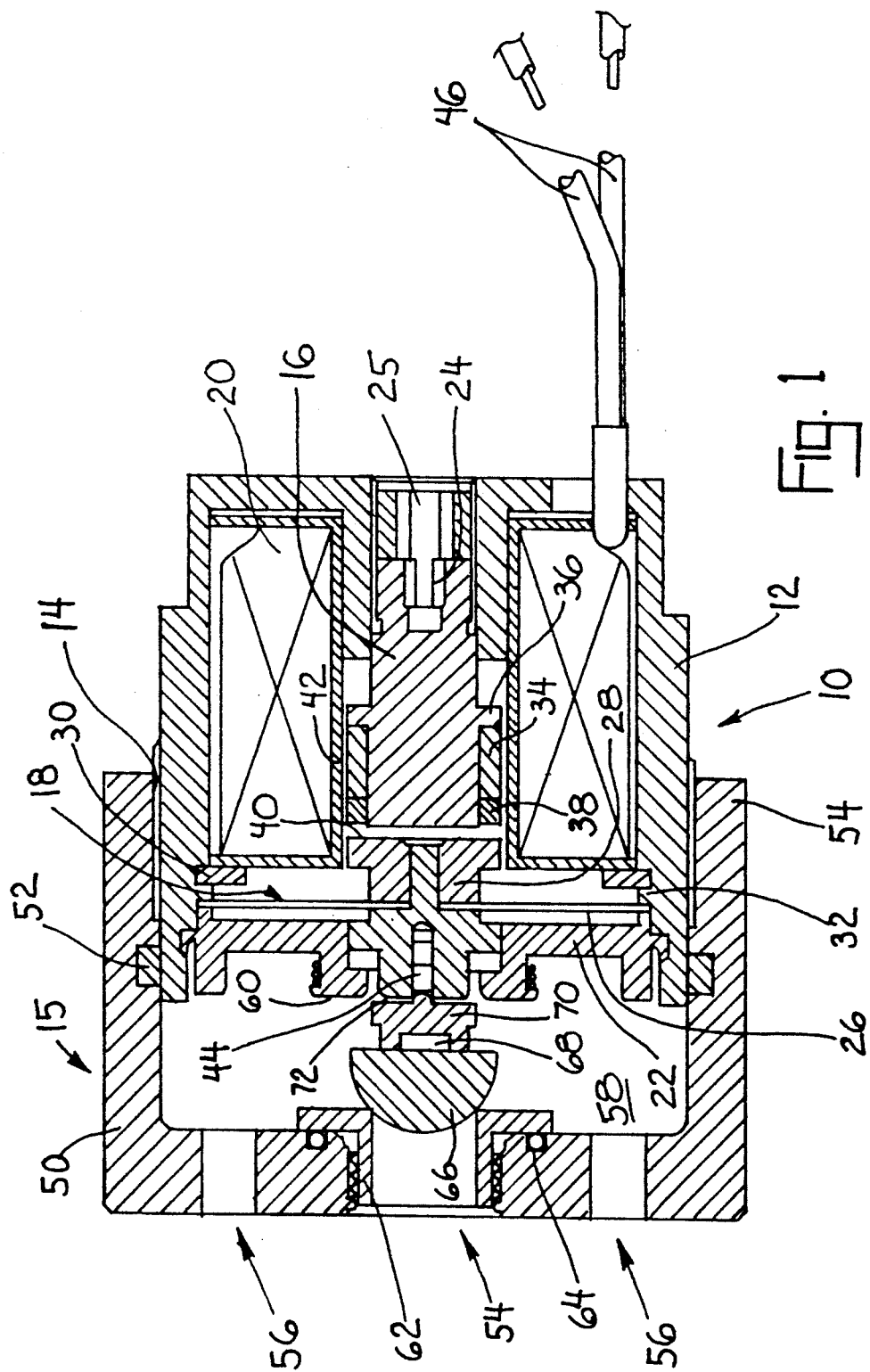

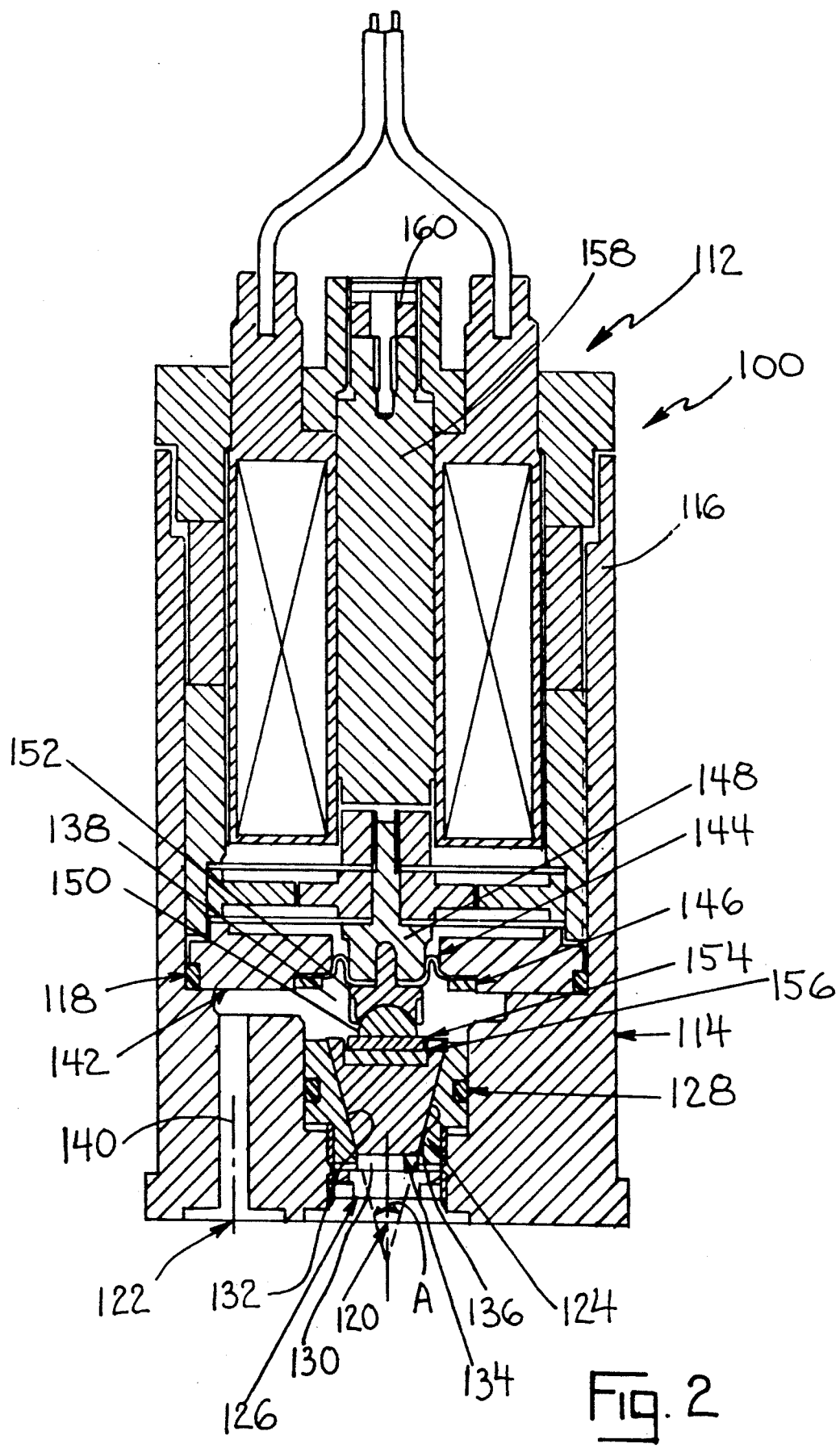

SOLENOID VALVE

CROSS REFERENCE TO RELATED APPLICATION

This is a continuation-in-part of patent application Ser. No. 577,673, filed on Sep. 4, 1990, U.S. Pat. No. 5,108,071 dated Apr. 28, 1992.

BACKGROUND OF THE INVENTION

This invention relates generally to rectilinear motion proportional solenoids and has application to solenoids which produce a motion-directed output which is linearly proportional to the electrical input current applied to the coil of the solenoid. More particularly, this invention is directed to the valve which is actuated by such solenoids.

This case is a companion to patent application Ser. No. 662,911, filed on Mar. 1, 1991, which is directed to an improved linear proportional solenoid which actuates the valve of preferred embodiment of the present invention. Both inventions have been assigned to the same assignee. The complete disclosure and specification of that pending application is specifically incorporated herein by reference.

Linear proportional solenoids are shown and described in U.S. Pat. Nos. 4,463,332; 4,767,097; and 4,835,503. In each of these patents, the permanent magnet whose magnetic field aids the magnetic field created by the electrical current-induced coil has various operative locations. In U.S. Pat. Nos. 4,463,332 and 4,767,097 the permanent magnet surrounds the coil. In U.S. Pat. No. 4,835,503 the permanent magnet is placed interiorly of the coil and located in the end face of the polepiece. In each of the aforementioned patents, there are two linear springs which are positioned within the flux path of the solenoid and which carry the moveable armature of the solenoid.

Particular attention is drawn to U.S. Pat. No. 4,767,097, which incorporates a spherical ball element slidably disposed within a cylindrical valve seat. While that design was an improvement over the prior art of that time, minor defects have been encountered and the present invention obviates these problems.

More specifically, it has been found that the ball has a tendency to flutter in its socket and does not always engage well with the valve seat. This causes a discontinuity of flow.

In the two embodiments described hereinafter, the valve seat is rigidly fixedly mounted in the flow path and the poppet is loosely secured to the valve stem such that the poppet is free to move in a lateral plane relative to the surface of the valve stem and to the surface of the valve seat.

It will be understood that, while the specific design and the components within the valve of the two embodiments are distinct, there is a principal involved which applies to both embodiments. That critical principal is that the poppets of each embodiment are secured to the valve stems by a magnetic means.

In one embodiment, the poppet is hemispherical in shape, as will be explained subsequently in detail, with its flat portion facing the valve stem. A magnet is secured in the face of the valve stem, and the poppet is free to move in a lateral direction in order to effect a more perfect seal between the hemispherical portion of the poppet and the valve seat.

In the second embodiment, the tip portion of the valve stem, i.e., facing the poppet, is a modified ball and socket joint, modified to the extent that the "ball" is a hemisphere, with the hemispherical surface facing inwardly and the flat surface facing toward the poppet. In this embodiment, the magnet is secured to the flat surface of the hemisphere and a mating ferromagnetic disc is imbedded into the surface of the poppet.

In this second embodiment, the surface of the valve seat is a conically shaped surface extending from the centrally located orifice. The poppet is also conically shaped, and has a cone angle which is substantially equal to the cone angle of the conically shaped valve seat. It is preferred that both cone angles are approximately 30°.

The poppets of both of the preferred embodiments of this invention are self-centering and self-aligning, forming a much improved valve and overcoming the aforementioned difficulties.

SUMMARY OF THE INVENTION

In the following described invention, the solenoid includes a housing in which there is mounted a moveable armature assembly and a polepiece spaced from the armature assembly. A coil is also carried within the housing for inducing magnetic flux through the polepiece and armature assembly. A permanent magnet is carried by the polepiece. The permanent magnet extends annularly about the polepiece so as to increase the permanence of the magnet circuit created by the coil through the armature assembly and polepiece.

At the forward facing end of the armature is secured a valve assembly of improved design. The valve assembly is comprised of three elements, the valve seat, the valve poppet and a carrier for the valve poppet. In one embodiment, the carrier extends from the armature and has a cylindrically shaped indentation at the front thereof. In the indentation is placed a tiny magnet. The magnet fixes the hemispherically shaped poppet to the carrier in such a fashion that the poppet is laterally movable, thereby affecting a secure alignment with the valve seat when the solenoid is de-actuated.

In the second embodiment, there is an indentation in the upper face of a truncated conically shaped poppet, in which is secured a tiny ferromagnetic disc. A cooperating magnet is secured to the face of the carrier. The magnet fixes the conically shaped poppet to the carrier in a fashion similar to that of the first embodiment, in that the poppet is laterally movable, again affecting a secure alignment of the poppet with the valve seat.

The valve assembly of this invention is highly efficient and allows for a significant reduction in the number of components or parts of the valve. By reducing the number of parts, an electromagnetic valve unit can be produced of economic construction and of smaller size than those units previously discussed in the above paragraphs.

Therefore, it is an object of this invention to provide an electromagnetic valve unit having a more efficient design.

Another object of this invention is to provide a valve assembly having a minimal number of parts but which includes a self-adjusting shaped poppet which more securely mates with the valve seat.

Still another object of this invention is to provide a valve assembly which is of compact design and of economic construction.

Other objects of this invention will become apparent upon a reading of the following description.

BRIEF DESCRIPTION OF THE DRAWING

FIG. 1 is a longitudinal sectional view of the solenoid and valve assembly of one embodiment of this invention.

FIG. 2 is a longitudinal sectional view of a second embodiment of a solenoid and valve assembly constructed in accordance with the present invention.

DESCRIPTION OF THE PREFERRED EMBODIMENT

The preferred embodiment of the present invention is shown in FIG. 1 and is illustrated by a stacked, linear proportional solenoid 10 in combination with a fluid control valve 15. Both devices are mounted within a unitary, integrally formed housing which is generally cylindrical in shape, the view of the drawing being cross-sectional along the longitudinal axis of that cylinder.

Solenoid 10 includes a housing 12 which is adapted by exterior threads 14 to be connected to valve assembly 15. Illustrations of such valve assemblies are found in U.S. Pat. Nos. 4,767,097 and 4,835,503, both incorporated herein by reference. Solenoid 10 further includes a polepiece 16, an armature assembly 18, an electromagnetic coil 20, and a front ring 22.

Polepiece 16 is threadably connected to housing 12 and is adjustably axially with respect to the housing by insertion of a keyed tool (not shown) into bore 24 of the polepiece and locked in position with lock-nut 25. Such movement of the polepiece serves to vary the spacing between the polepiece and armature assembly which allows adjustment in gain or calibration of the solenoid. Armature assembly 18 is of a three-component construction which includes a single component linear spring part 26 and a two-component armature part 28. The components of armature part 28 are connected together by threaded attachment on opposite sides of spring part 26 so as to clamp the spring part between the armature part components. Coil 20 is retained within housing 12 by a retainer ring 30 fitted into a receiving groove within the housing.

Armature assembly 18 is secured with housing 12 by front ring 22 which is threaded into the housing and which serves to clamp the outer circumferential periphery of spring part 26 against annular shoulder 32 of the housing. A permanent magnet 34 which is of cylindrical form extends in an annular orientation about the polepiece abutted against an annular inset flange 36 of the polepiece. An annular ring 38 is fitted about polepiece 16 in abutment with the opposite end of magnet 34 at the end face 40 of the polepiece. Magnet 34 is preferably formed from rare earth materials, such as samarium cobalt. Housing 12, polepiece 16, ring 38, spring part 26, armature part 28, and front ring 22 are all formed from ferrous materials. As illustrated in FIG. 1, there is a space, commonly known as a core gap, between end face 40 of polepiece 16 and armature part 38. There are also spaces, commonly known as side gaps, between armature part 28 and front ring 22. The bobbin 42 which carries the windings for coil 20 is of a non-metallic construction, such as plastic. The threaded bore 44 to the front of armature part 28 is used to secure the valve assembly to the armature for actuation upon axial movement of the armature part relative to housing 12.

Solenoid 10 is coupled to valve assembly 15 by threaded section 14 of body 12. O-ring 52 serves as a fluid-tight seal. Lock ring 54 is provided to further secure valve body 50 to solenoid body 12. Diaphragm 60, of conventional design, is applied to the front portion of armature part 28 and front ring 22 to prevent fluids from penetrating into the solenoid.

Valve assembly 15 includes inlet port 54 and one or more outlet ports 56. Ports 54 and 56 are joined by chamber 58.

Seat insert 62 is threaded into port 54, a seal being effected by virtue of O-ring 64. Seat insert 62 is, of course, bored to permit fluid flow through port 54 to chamber 58.

Poppet 66 is secured to armature 28 by a magnetic/mechanical coupling arrangement which includes hemispherically shaped poppet 66, magnet 68 and magnet retainer 70. Retainer 70 is secured to armature 28 by virtue of insertion into threaded bore 44. Flat washer 72, surrounding the opening in diaphragm 60, ensures a fluid-tight seal.

Since poppet 66 is retained by magnet 68 to retainer 70, it is self-aligning with seat insert 62. That is to say, the retention is such that it affords movement of poppet 66 in any lateral direction relative to retainer 70.

The manner of operation of a linear proportional solenoid of the general form of above described is explained in detail in U.S. Pat. No. 4,463,332, incorporated herein by reference, as well as the aforementioned U.S. Pat. Nos. 4,767,097 and 4,835,503. As such, a detailed explanation of the operation of solenoid 10 will not be repeated since any one of ordinary skill in the art will have more than adequate understanding of the technical manner of operation of the solenoid.

In brief, solenoid 10 is actuated by applying a current through leads 46 to coil 20 which induces a flux path through polepiece 16, armature part 28, front ring 22 and housing 12. Armature part 28 moves axially rearward relative to valve 15, thereby withdrawing poppet 66 from seat insert 62, opening port 54 and permitting the entry of fluid.

Poppet 66, hemispherically shaped, is of a diameter greater than the diameter of port 54. When the current is cut off, solenoid 10 is de-actuated, armature part 28 moves axially forward and poppet 66 seals port 54. Because it is held by magnet 68, poppet 66 "seeks" a more perfect seal than that previously realized with poppets of different designs.

FIG. 2 shows an alternative embodiment of the present invention in the form of control valve 100, in combination with solenoid 112 of a slightly different configuration. Control valve 100 incorporates as an operating mechanism a stacked solenoid assembly 112 of the type which is described in detail in U.S. Pat. No. 4,767,097. To the extent necessary for a full and complete understanding of the following discussion, the subject matter contained in the '097 patent is hereby incorporated by reference into the present discussion. A detailed description of the structure and operation of solenoid 112 will not be repeated here.

Valve 100 includes a housing 114 which has upstanding sidewalls 116 for receiving proportional solenoid 112. Solenoid 112 is sealed to housing 114 by O-ring seal 118.

Housing 114 is provided with an inlet port 120 and an outlet port 122. (It will, of course, be understood that the designations of inlet and outlet may be reversed.) Fitted to the housing justin by inlet 120 is a valve seat 124 which is secured in position by retainer 126, and which is sealed to housing 114 by O-ring 128. Valve seat 124 is provided with a central orifice 140 and a conically shaped surface 132 extending outwardly from orifice 130. Disposed immediately adjacent conically shaped surface 132 is a truncated conical poppet 134 having an outer surface 136. The included cone angles (angle A of FIG. 2) of conical surface 132 and conical poppet 136 are substantially equal, which means that surfaces 132 and 136 are substantially parallel. The preferred cone angle of both surface 132 and poppet 136 is approximately 30°. This means that when the poppet is moved vertically (as pictured in FIG. 2) by 0.001", a gap having a width of 0.00025" results between surfaces 132 and 136. In other words, there is a four-to-one relationship existing between the linear distance travelled by poppet 134 and the resulting gap width between surfaces 132 and 136. This relationship increases the sensitivity of the valve in making minute flow adjustments, and decreases the sensitivity to unwanted flow variations caused by pressure fluctuations.

Valve 100 provides a flow path for gaseous media which begins at inlet 120, extends through the gap which exists between surfaces 132 and 136 when poppet 134 is in its raised or open position and into region 138 above poppet 134. From region 138, the flow path extends through opening 140 to outlet port 122.

Region 138 is partially bounded by diaphragm plate 142 to which is mounted diaphragm 144. Diaphragm 144 is retained in position by diaphragm retainer 146. Diaphragm 144 allows valve stem 148 to move in a linear fashion while isolating the interior workings of solenoid 112 from the gaseous medium in the flow path.

In the embodiment illustrated in FIG. 2, poppet 134 is secured to valve stem 148 by a magnetic/mechanical coupling arrangement which includes a swivel ball 150 and a swivel ball retainer 152. Retainer 152 is secured, by threads, friction or the like, to valve stem 148. Swivel ball 150 is formed of a ferromagnetic material (such as steel). A permanent magnet 154 is provided, and attaches to the flat underside of swivel ball 150. In the embodiment illustrated, poppet 134 and valve seat 124 are formed of non-magnetic materials. A ferromagnetic plate 156 is attached to a top portion of poppet 134 to provide a surface to which magnet 154 will magnetically attract and bond.

As with the embodiment illustrated in FIG. 1, poppet 134 is self-aligning with valve seat 124. When the valve is closed, swivel ball 150 is positioned relative to retainer 152 in such a manner as to align surfaces 132 and 136 in parallel relation. As solenoid 112 is energized, swivel ball retainer 152 moves vertically (as pictured in FIG. 2) and poppet 134 is raised via the magnetic coupling which exists between retainer 152, swivel ball 150, magnet 154 and ferromagnetic plate 156.

An advantage of operating a metering valve of this type with a proportional solenoid is the ease with which the device may be adjusted or calibrated by controlling the level of current supplied to the solenoid coil. However, control valve 100 may also be externally calibrated by adjusting orifice retainer 126 (and thus the positioning of valve seat 124 relative to housing 114), or by adjusting armature 158 of solenoid 112 by means of threaded adjusting mechanism 160. Both of these alternative mechanical forms of adjustment or calibration may be performed externally (i.e., without disassembly of or direct access to the internal workings of valve 100).

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

I claim:

1. A valve actuating apparatus comprising:
   a valve assembly and a proportional solenoid assembly;
   a unitary housing having inlet and outlet passages;
   said valve assembly mounted within said inlet passage for controlling fluid flow therethrough;
   said solenoid assembly being mounted within said housing and having an armature assembly adjacent said valve assembly;
   said valve assembly having a valve seat and poppet cooperatively associated therewith for restricting fluid flow past said valve seat, means for providing magnetic attraction, said poppet normally disposed in movable association with and relative to said armature assembly, said magnetic attraction means connecting said poppet and armature assembly together;
   said solenoid assembly being actuatable to move its said armature assembly and said poppet away from said valve seat to permit fluid flow past said valve seat.

2. A valve actuating apparatus according to claim 1, wherein said poppet is hemispherically shaped, with its rounded surface facing said valve seat and with its flat surface facing said armature assembly.

3. A valve actuating apparatus according to claim 2, wherein said magnetic attraction means includes a magnet fitted between said armature assembly and said poppet.

4. A valve actuating apparatus according to claim 1 wherein said poppet as a truncated conical configuration mateable with said valve seat.

* * * * *